United States Patent [19]

Sakano

[11] Patent Number: 4,991,405
[45] Date of Patent: Feb. 12, 1991

[54] AUTOMOTIVE AIR CONDITIONING SYSTEM

[75] Inventor: Riichi Sakano, Saitama, Japan

[73] Assignee: Sanden Corporation, Gunma, Japan

[21] Appl. No.: 565,898

[22] Filed: Aug. 10, 1990

Related U.S. Application Data

[63] Continuation of Ser. No. 386,725, Jul. 31, 1989, abandoned.

[30] Foreign Application Priority Data

Jul. 29, 1988 [JP] Japan .................. 63-188394

[51] Int. Cl.$^5$ .............................. B60H 1/32
[52] U.S. Cl. ...................... 62/244; 62/428; 98/2.11; 165/42
[58] Field of Search ............ 62/324.1, 244, 428, 62/507, 323.3; 98/2.11; 165/42, 43

[56] References Cited

U.S. PATENT DOCUMENTS

| | | | |
|---|---|---|---|
| 2,479,170 | 8/1949 | Kuempel | 62/323.3 X |
| 2,922,290 | 1/1960 | Carraway | 165/43 X |
| 3,817,054 | 6/1974 | Adams | 62/244 X |
| 4,051,692 | 10/1977 | Ku et al. | 62/244 |
| 4,412,425 | 11/1983 | Fukami et al. | 62/244 |
| 4,473,109 | 9/1984 | Kojima et al. | 62/244 X |
| 4,494,597 | 1/9185 | Fukami et al. | 98/2.11 X |
| 4,593,609 | 6/1986 | Nagatomo et al. | 98/2.11 X |
| 4,688,394 | 8/1987 | Waldorf | 62/243 |
| 4,718,244 | 1/1988 | Kobayashi | 62/244 X |
| 4,763,564 | 8/1988 | Czarnecki et al. | 62/244 X |

FOREIGN PATENT DOCUMENTS

| | | |
|---|---|---|
| 257017 | 2/1988 | European Pat. Off. . |
| 57-178913 | 11/1982 | Japan . |
| 61-46710 | 3/1986 | Japan . |

Primary Examiner—William E. Tapolcai
Attorney, Agent, or Firm—Banner, Birch, McKie & Beckett

[57] ABSTRACT

An automotive air conditioning system according to the present invention includes a heat pump circuit comprising a first heat exchanger and a second heat exchanger. The first heat exchanger provides cooled or heated air to a passenger compartment. The second heat exchanger is provided with an outside air inlet path that conducts outside air to the second heat exchanger. Passenger compartment air is also conducted to the second heat exchanger by an air conducting path. The flow of air from the passenger compartment and the outside is selectively conducted to the second heat exchanger by a damper that responds to air flow demand.

19 Claims, 4 Drawing Sheets

AUTOMOTIVE AIR CONDITIONING SYSTEM

This application is a continuation, of application Ser. No. 07/386,725, filed Jul. 31, 1989, now abandoned.

BACKGROUND OF THE INVENTION

1. Field of the Invention

The present invention generally relates to an air conditioning system, such as for use in cooling and heating passenger compartments in automotive vehicles, and more particularly, to an air conditioning system having an improved structure for more efficiently cooling and heating automobile passenger compartments. Air conditioning system, as used herein, refers to a system that both heats and cools passenger compartment air.

2. Description of the Prior Art

Generally, closed automotive air conditioning systems experience a common problem in that during the cooling or heating operations, the air in the passenger compartment becomes either very dry or humid as the system cools or heats, respectively. Excessively dry air creates discomfort for the vehicle's passengers. The dryness occurs because the passenger compartment's air is continuously recirculated in a closed system, and the process of cooling recirculated air reduces its moisture content. Excessively moist air also creates discomfort for passengers, but more significantly, the moist air clouds up the passenger compartment's windows and thereby creates a safety hazard. Consequently, it is desirable to introduce fresh, outside air into the passenger compartment in order to better maintain the humidity level.

Figure 1:
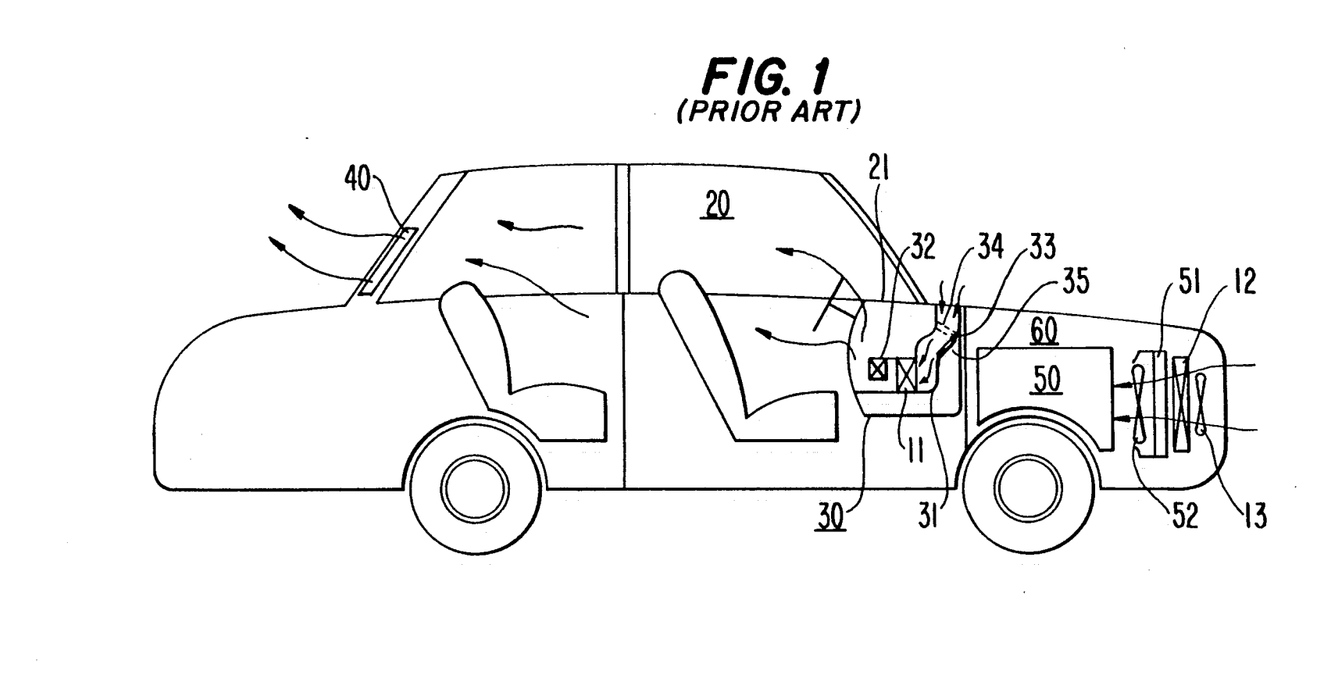
FIG. 1 is a schematic illustration of a conventional automotive air conditioning system.

In prior art air conditioning systems, the introduction of outside air into the passenger compartment significantly decreases the efficiency of the heating and cooling process. For example FIG. 1 illustrates one type of conventional automotive air conditioning system that includes a refrigerating circuit comprising a first heat exchanger, a compressor, a second heat exchanger and a receiver-dryer, all of which are connected in series by a coolant pipe member. A thermal expansion valve is disposed between the receiver-dryer and the first heat exchanger. The system also includes a heater circuit comprising a heater core, a radiator and a blower. Such a system suffers from the above-described problem, namely, if fresh, outside air is introduced into the passenger compartment, the system's cooling and heating efficiency is significantly reduced.

Specifically, in a system such as that illustrated in FIG. 1, evaporator (i.e., first heat exchanger) 11 is disposed in passenger compartment 20 of an automobile, or more precisely, in duct assembly 30 which is located under dashboard 21 of the automobile. Duct assembly 30 includes duct 31 in which evaporator 11, heater core 32 and a blower (not shown) are disposed. Damper 33, which is also disposed in duct 31, selectively opens and closes outside air inlet opening 34 and passenger compartment air inlet opening 35 by pivotal movement thereof. Damper 33 is configured so as to pivot and close passenger compartment air inlet opening 35, and simultaneously open outside air inlet opening 34. In this configuration, the blower is used to introduce outside air into duct 31 through outside air inlet opening 34. In order to heat passenger compartment 20, heater core 32 acts as a heat source for the system by utilizing the heat generated from engine 50.

Condenser (i.e., second heat exchanger) 12 is disposed in engine compartment 60 and disposed at the front portion of the automobile or, more precisely, in front of radiator 51. Outside air is conducted into engine compartment 60, and is passed through condenser 12 and radiator 51, by the operation of condenser fan 13 and radiator fan 52. Accordingly, refrigerant in condenser 12 which is flowing from the system compressor (not shown) is heat exchanged with the outside air. That is, the refrigerant is condensed by radiating heat therefrom into the outside air.

In response to a demand to cool passenger compartment 20, outside air is continuously introduced into duct 31 through outside air inlet opening 34 and is passed through evaporator 11 by the operation of the blower. Consequently, outside air is heat exchanged with the refrigerant in evaporator 11. That is, the refrigerant in evaporator 11 is vaporized by absorbing heat from the outside air. Accordingly, the outside air is cooled and blown into passenger compartment 20, which is thereby cooled. The air in passenger compartment 20 is continuously vented to the outside of the automobile through ventilator 40 which is disposed at the two, rear quarter-panels of the automobile. Heater core 32 is not operated during the cooling operation.

In response to a demand to heat passenger compartment 20, outside air is introduced continuously into duct 31 through outside air inlet opening 34 and is passed through heater core 32 by the operation of the blower. Consequently, the outside air is heat exchanged with the fluid in heater core 32. Accordingly, the outside air is warmed and blown into passenger compartment 20, which is thereby heated. As in the cooling operation, the air in passenger compartment 20 is continuously vented to the outside of the automobile through ventilator 40. The air cooling part of the system is not operated during the heating operation.

In addition to the above-described, outside air inlet mode of operation, a system as illustrated in FIG. 1 utilizes two other air inlet modes of operation, such as the (1) passenger compartment air inlet mode and (2) mixed air inlet mode. In the passenger compartment air inlet mode, damper 33 is pivoted so that passenger compartment air inlet opening 35 is opened, and simultaneously, outside air inlet opening 34 is closed. In this configuration, the position of damper 33 is illustrated by the dashed line in FIG. 1. In the mixed air inlet mode, damper 33 is rotated to a central position so that both passenger compartment air inlet opening 35 and outside air inlet opening 34 are maintained in the open position.

A problem occurs while cooling in the passenger compartment air inlet mode of operation. The cooling process acts to remove moisture from the cooled air. Consequently, the humidity in passenger compartment 20 is significantly reduced, because only the compartment's air is circulated in this mode of operation. Such a lack of humidity produces discomfort for passengers in the automobile.

Another problem occurs while heating in the passenger compartment air inlet mode. Since only passenger, compartment air is circulated, the inside surfaces of the automobile windows fog or cloud up due to the high moisture content of the inside air relative to that of the outside air. This fogging or clouding of the windshield and the side and rear windows creates a safety hazard for passengers in the automobile. Therefore, it is desirable to use the outside air inlet mode as much as possible, in order to introduce a continuous flow of fresh, outside air into passenger compartment 20 and prevent the above-mentioned problems encountered in prior art systems.

Another problem is created by using the outside air inlet mode of operation while either cooling or heating the automobile passenger compartment. In the prior art, when the system is operated in the outside air inlet mode, passenger compartment air is mixed with a similar amount of outside air, and the mixture is then continuously vented from passenger compartment 20 to the outside of the automobile. However, since the outside air does not flow through, or utilize the cooling or heating contribution of, the second heat exchanger, the outside air's temperature is significantly different from that of the passenger compartment. Consequently, the overall cooling and heating efficiency of the system is lowered by a significant amount. As a result, operation of the air conditioner or heater in the outside air inlet mode, cannot be sustained for long periods of time if the outside air temperature is excessively hot or cold, respectively.

A heat pump may be used in an automobile air conditioning system to improve the cooling and heating efficiency of the system in the outside air inlet mode of operation. For example, Japanese Patent Application Publication No. 62-181909 discloses an automobile air conditioning system that includes a heat pump circuit. When the heat pump circuit is used for heating, the first heat exchanger is disposed in the passenger compartment and is used as a condenser. The second heat exchanger is disposed in the engine compartment and is used as an evaporator. However, in order to effectively maintain the heat exchanging capability of the second heat exchanger even if the outside air temperature is very low, this prior art provides a very complicated mechanism for conducting air to the second heat exchanger. This mechanism is made complicated because of the method used to provide hot air generated by the engine to the second heat exchanger.

SUMMARY OF THE INVENTION

Accordingly, it is a primary object of the present invention to provide an automotive air conditioning system that can operate efficiently when hot or cold outside air is conducted into the passenger compartment.

It is another object of the present invention to provide an automotive air conditioning system with a simple mechanism for conducting air to a second heat exchanger.

An automotive air conditioning system according to the present invention includes a heat pump circuit comprising a first heat exchanger and a second heat exchanger. The first heat exchanger provides cooled or heated air to a passenger compartment. The second heat exchanger is provided with an outside air inlet path that conducts outside air to the second heat exchanger. Passenger compartment air is also conducted to the second heat exchanger by an air conducting path. The flow of air from the passenger compartment and the outside is selectively conducted to the second heat exchanger by a damper that responds to air flow demand.

BRIEF DESCRIPTION OF THE DRAWINGS

A more complete appreciation of the present invention and many of the attendant advantages thereof will be readily obtained as the invention becomes better understood by reference to the following detailed description when considered in connection with the accompanying drawings.

DETAILED DESCRIPTION

Figure 2:
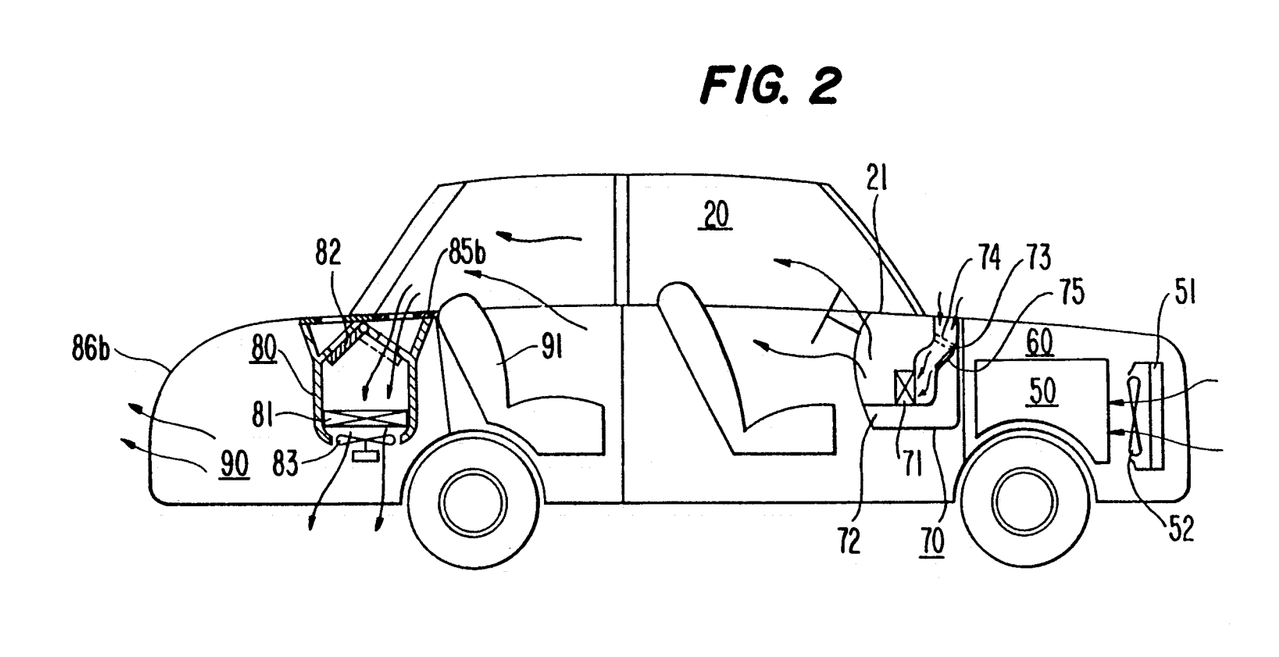
FIG. 2 is a schematic illustration of an automotive air conditioning system in accordance with a preferred embodiment of the present invention.

As noted above, air conditioning system, as used herein, refers to a system that both heats and cools passenger compartment air. FIG. 2 schematically illustrates an automotive air conditioning system in accordance with a preferred embodiment of the present invention. First heat exchanger 71 is disposed in passenger compartment 20 of an automobile, or more precisely, in first duct assembly 70 which is located under dashboard 21. First duct assembly 70 includes duct 72 in which first heat exchanger 71, damper 73 and a blower (not shown) are disposed. Damper 73 selectively opens and closes first outside air inlet opening 74 and first passenger compartment air inlet opening 75 by pivotal movement thereof. Damper 73 is arranged so as to pivot and close first passenger compartment air inlet opening 75, while simultaneously opening first outside air inlet opening 74. In this configuration, the blower is used to introduce outside air into duct 72 through first outside air inlet opening 74.

Figure 3:
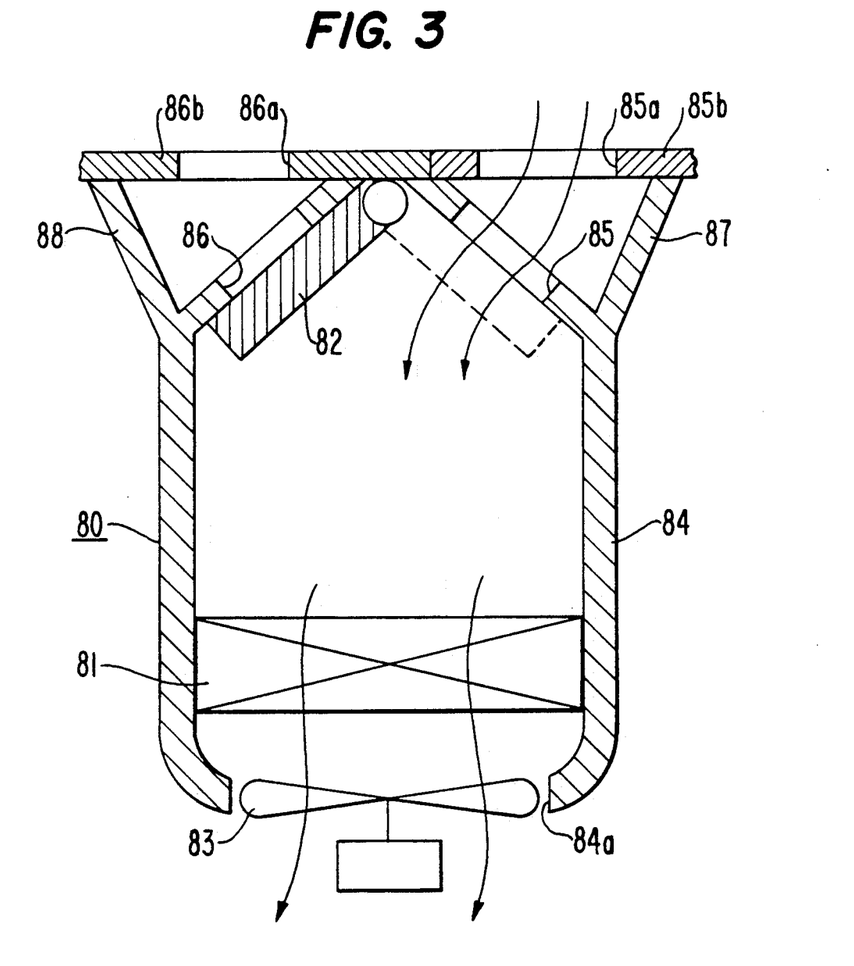
FIG. 3 is a partially enlarged schematic illustration of a second heat exchanger and duct assembly for the automotive air conditioning system shown in FIG. 2.

FIG. 3 is an enlarged, schematic illustration of a second heat exchanger and duct assembly for the present invention. The same numerals are used in FIG. 3 to denote the corresponding elements shown in FIG. 2. Referring to FIGS. 2 and 3, second heat exchanger 81 is disposed in trunk compartment 90 which is defined at a rear portion of the automobile, or more precisely, in second duct assembly 80 which is located behind rear seat 91. Second duct assembly 80 includes damper 82, motor fan 83, and casing 84 in which second heat exchanger 81 is disposed. Large opening 84a is formed at a bottom of casing 84 to accommodate motor fan 84 therein. A top of casing 84 is shaped to have two slanted surfaces, which shape resembles a gabled roof. Second passenger compartment air inlet opening 85 is formed at the front slanted top (to the right side in FIG. 3). Second outside air inlet opening 86 is formed at the rear slanted top (to the left side in FIG. 3).

Openings 85a and 86a are formed at rear tray 85b and trunk lid 86b, respectively. Duct 87 links second passenger compartment air inlet opening 85 to opening 85a, which forms an air-tight connection. Duct 88 links second outside air inlet opening 86 to opening 86a, which also forms an air-tight connection. Ducts 87, 88 and casing 84 are formed in one body. Damper 82 selectively opens and closes second passenger compartment air inlet opening 85 and second outside air inlet opening 86 by pivotal movement thereof. In FIG. 3, damper 82 pivots and closes second outside air inlet opening 86, and simultaneously, opens second passenger compartment air inlet opening 85. Consequently, motor fan 83 is used to introduce passenger compartment air into casing 84 through opening 85a and second passenger compartment air inlet opening 85. Conversely, when damper 82 pivots and closes second passenger compartment air inlet opening 85, and simultaneously, opens second outside air inlet opening 86 (illustrated by a dashed line in FIG. 3), motor fan 83 is used to introduce outside air into casing 84 through opening 86a and second outside air inlet opening 86.

A driving device (not shown) is connected to damper 82 to selectively pivot damper 82 as follows. When the automotive air conditioning system is operated in the outside air inlet mode, damper 82 closes second air inlet opening 86, and simultaneously, opens second passenger compartment air inlet opening 85. On the other hand, when the automotive air conditioning system is operated in the passenger compartment air inlet mode, damper 82 pivots and closes second passenger compartment air inlet opening 85, and simultaneously, opens second outside air inlet opening 86. In addition, damper 82 opens second passenger compartment air inlet opening 85 when at least one of the automobile's doors is either opened or closed. This operation prevents passenger discomfort such as, for example, ear discomfort caused by rapidly increasing or decreasing air pressure in passenger compartment 20.

Figure 4:
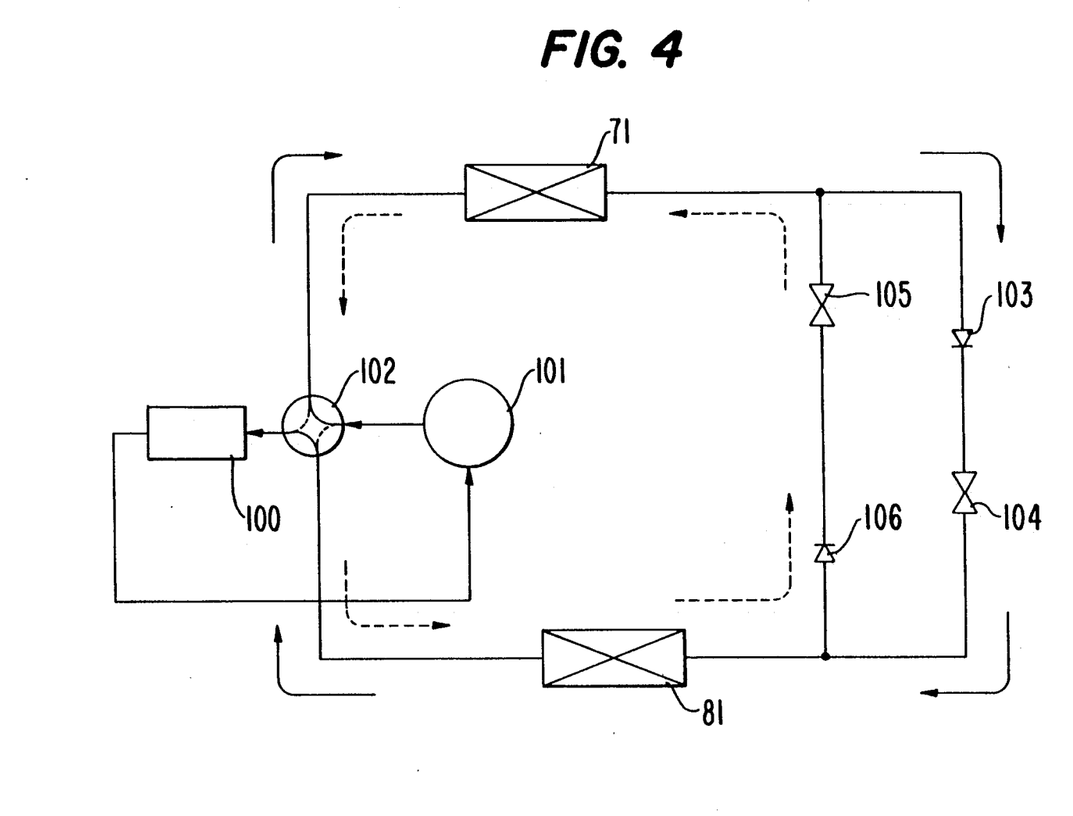
FIG. 4 is a block diagram of a heat pump circuit for the automotive air conditioning system shown in FIG. 2.

FIG. 4 is a block diagram of a heat pump circuit for the present invention. Referring to FIG. 4, the heat pump circuit includes first heat exchanger 71, second heat exchanger 81, accumulator 100, compressor 101 and four-way valve 102. First, second, third and fourth openings of four-way valve 102 are connected to a discharge port of compressor 101, first heat exchanger 71, second heat exchanger 81 and an inlet port of accumulator 100, respectively. An outlet port of accumulator 100 is connected to a suction port of compressor 101. First check valve 103 and first expansion valve 104 are disposed in series between first and second heat exchangers 71 and 81. Second check valve 105 and second expansion valve 106 are also disposed in series between first and second heat exchangers 71 and 81. First check valve 103 and first expansion valve 104 are in parallel with second check valve 105 and second expansion valve 106. In FIG. 4, the solid arrows indicate the direction of refrigerant flow when the heat pump circuit is used for air conditioning (cooling), and the dashed arrows indicate the direction of refrigerant flow when the heat pump circuit is used for heating.

In operation, in response to a demand to cool passenger compartment 20 of FIG. 2, four-way valve 102 is switched (solid lines in valve 102) to configure the heat pump circuit as an air conditioning system. Also, damper 73 of first duct assembly 70 pivots and closes first passenger compartment air inlet opening 75, and simultaneously, opens first outside air inlet opening 74. At the same time, damper 82 of second duct assembly 80 closes second outside air inlet opening 86, and simultaneously, opens second passenger compartment air inlet opening 85. Accordingly, the outside air is continuously introduced into duct 72 through first outside air inlet opening 74 and is passed through first heat exchanger 71 by the operation of the blower. In this configuration, first heat exchanger 71 is utilized as an evaporator. Consequently, the outside air is heat exchanged with the refrigerant in first heat exchanger 71, or more precisely, the refrigerant in first heat exchanger 71 is vaporized by absorbing heat thereto from the outside air. As a result, the outside air is cooled. The cooled, outside air is then blown into passenger compartment 20, and passenger compartment 20 is thereby cooled. Subsequently, the air in passenger compartment 20 is continuously flowed to casing 84 of second duct assembly 80 via duct 87. There, the air is heat exchanged with the refrigerant in second heat exchanger 81. In this configuration, second heat exchanger 81 is utilized as a condenser, or more precisely, the refrigerant in second heat exchanger 81 is condensed by radiating heat therefrom to the passenger compartment air in casing 84. This heat exchanged air is continously vented to the outside of the automobile.

On the other hand, in response to a demand to heat passenger compartment 20, four-way valve 102 is switched (dashed lines in valve 102) to configure the heat pump circuit as a heating system. However, dampers 73 and 82 are maintained in their above-described positions. Accordingly, the outside air is continuously introduced into duct 72 through first outside air inlet opening 74 and is passed through first heat exchanger 71 by the operation of the blower. In this configuration, first heat exchanger 71 is utilized as a condenser. Consequently, the outside air is heat exchanged with the refrigerant in first heat exchanger 71, or more precisely, the refrigerant in first heat exchanger 71 is condensed by radiating heat therefrom to the outside air in duct 72. As a result, the outside air is warmed and blown into passenger compartment 20, and passenger compartment 20 is thereby heated. Next, the air in passenger compartment 20 is continuously flowed to casing 84 of second duct assembly 80 via duct 87, where the air is then heat exchanged with the refrigerant in second heat exchanger 81. In this configuration, second heat exchanger 81 is utilized as an evaporator, or more precisely, the refrigerant in second heat exchanger 81 is vaporized by absorbing heat thereto from the passenger compartment air. The heat exchanged air is continuously vented to the outside of the automobile.

In accordance with the above-described operation of the present invention, the second heat exchanger is used to effectively maintain the overall heat exchanging capability of the system, because the refrigerant in the second heat exchanger can be heat exchanged with the passenger compartment air. This process reduces the temperature and humidity variances between the outside and passenger compartment air. Consequently, even if the air conditioning and heating system is operated in the outside air inlet mode, the system operates more efficiently. As a result, the air conditioning system can be operated in the outside air inlet mode for much longer time periods than the prior art. In addition, the effectiveness of the heat exchanging capability of the second heat exchanger can be obtained with the present invention's simple mechanism which conducts air to the second heat exchanger.

Furthermore, although the above-described embodiment illustrates damper 82 as having only two positions, one of which closes second passenger compartment air inlet opening 85, and the other which closes second outside air inlet opening 86, the invention is not limited in this respect. The damper's position can be changed continuously to any location between the second outside air inlet opening and the second passenger compartment air inlet opening.

Moreover, the present invention can be utilized in an electrically powered automobile as well as an automobile powered by an internal combustion engine. Also, this invention can be utilized in an automotive vehicle such as a truck.

This invention has been described in detail in connection with the preferred embodiment but is for illustrative purposes only and the invention is not limited thereto. It will be easily understood by those skilled in the art that variations and modifications can easily be made within the scope of this invention as defined by the appended claims.

I claim:

1. An air conditioning system for controlling the temperature of a vehicle passenger compartment, said air conditioning system comprising:
   a first heat exchanger comprising an evaporator;
   a second heat exchanger comprising a condensor;
   first duct means for conducting air from said first heat exchanger to said vehicle passenger compartment;
   second duct means for conducting air from said vehicle passenger compartment to said second heat exchanger;
   third duct means for conducting air from outside said vehicle passenger compartment to said second heat exchanger; and
   means for selectively opening and closing said first, said second and said third duct means.

2. The air conditioning system according to claim 1 wherein said first heat exchanger is disposed in said vehicle passenger compartment.

3. The air conditioning system according to claim 1 wherein said second heat exchanger is disposed outside of said vehicle passenger compartment.

4. The air conditioning system according to claim 3 wherein said second heat exchanger is disposed in a vehicle compartment outside of said vehicle passenger compartment.

5. The air conditioning system according to claim 1 wherein said first, second and third duct means are selectively opened and closed by dampers.

6. An automobile air conditioning system for controlling the temperature of air in an automobile passenger compartment comprising:
   a first duct assembly including a first outside air inlet port for admitting outside air to said first duct assembly and a first passenger compartment air inlet port for admitting air from said automobile passenger compartment to said first duct assembly, said first duct assembly further including a first heat exchanger, said first heat exchanger comprising an evaporator: and
   a second duct assembly including a second air inlet port for admitting air from said passenger compartment to said second duct assembly, said second duct assembly further including a second heat exchanger, said second heat exchanger comprising a condensor.

7. The automobile air conditioning system according to claim 6 wherein said first and second air inlet ports are selectively controlled by dampers.

8. The automobile air conditioning system according to claim 6 wherein said second heat exchanger is disposed outside of said automobile passenger compartment.

9. The automobile air conditioning system according to claim 8 wherein said second heat exchanger is disposed in a trunk compartment of an automobile.

10. The automobile air conditioning system according to claim 6 wherein said first heat exchanger is disposed in said automobile passenger compartment.

11. An air conditioning system for controlling the temperature of a vehicle passenger compartment, said air conditioning system comprising:
    a first heat exchanger comprising a condensor;
    a second heat exchanger comprising an evaporator;
    first duct means for conducting air from said first heat exchanger to said vehicle passenger compartment;
    second duct means for conducting air from said vehicle passenger compartment to said second heat exchanger;
    first damper means for selectively opening and closing said first duct means; and
    second damper means for selectively opening and closing said second duct means.

12. The automobile air conditioning system of claim 11 further comprising third duct means for conducting air from outside said vehicle passenger compartment to said second heat exchanger.

13. The automobile air conditioning system of claim 12 wherein said second damper means position is, relative to said second and said third duct means, continuously variable between a position which closes said second duct means and a position which closes said third duct means.

14. An air conditioning system for controlling the temperature of a vehicle passenger compartment, said air conditioning system comprising:
    a first heat exchanger comprising an evaporator;
    a second heat exchanger comprising a condensor;
    first duct means for conducting air from said first heat exchanger to said vehicle passenger compartment; and
    second duct means for conducting air from said vehicle passenger compartment to said second heat exchanger.

15. The automobile air conditioning system of claim 14 further comprising third duct means for conducting air from outside said vehicle passenger compartment to said second heat exchanger.

16. The automobile air conditioning system of claim 15 further comprising means for selectively opening and closing said first, said second and said third duct means.

17. An air conditioning system for controlling the temperature of a vehicle passenger compartment, said air conditioning system comprising:
    a first heat exchanger comprising a condensor;
    a second heat exchanger comprising an evaporator;
    first duct means for conducting air from said first heat exchanger to said vehicle passenger compartment; and
    second duct means for conducting air from said vehicle passenger compartment to said second heat exchanger.

18. The automobile air conditioning system of claim 17 further comprising third duct means for conducting air from outside said vehicle passenger compartment to said second heat exchanger.

19. The automobile air conditioning system of claim 18 further comprising means for selectively opening and closing said first, said second and said third duct means.

* * * * *

UNITED STATES PATENT AND TRADEMARK OFFICE
CERTIFICATE OF CORRECTION

PATENT NO. : 4,991,405

DATED : February 12, 1991

INVENTOR(S) : Sakano

It is certified that error appears in the above-identified patent and that said Letters Patent is hereby corrected as shown below:

In Column 4, line 46, "84" (second occurrence) has been changed to —83—.

In Column 5, line 36, change "Second check valve 105" to —Second check valve 106—;

line 37, change "second expansion valve 106" to —second expansion valve 105—;

line 40, change "second check valve 105" to —second check valve 106—;

line 41 change "expansion valve 106" to —expansion valve 105—;

line 41 change "solid" to —dashed—;

line 44, change "dashed" to —solid—;

line 48, change "solid" to —dashed—.

UNITED STATES PATENT AND TRADEMARK OFFICE
CERTIFICATE OF CORRECTION

PATENT NO. : 4,991,405

DATED : February 12, 1991

INVENTOR(S) : Sakano

It is certified that error appears in the above-identified patent and that said Letters Patent is hereby corrected as shown below:

Column 6, line 12, change "dashed" to --solid--.

Column 7, line 47, claim 6, change ":" to --;--.

Signed and Sealed this

Twenty-ninth Day of December, 1992

Attest:

DOUGLAS B. COMER

*Attesting Officer*    *Acting Commissioner of Patents and Trademarks*